United States Patent
Swanberg et al.

(10) Patent No.: US 7,152,307 B2
(45) Date of Patent: Dec. 26, 2006

(54) SWAGE COLLAR INSPECTION TOOL

(75) Inventors: Jeffery P. Swanberg, Ravensdale, WA (US); Richard W. Spicet, Seattle, WA (US); Mark Slagle, NE. Bothell, WA (US)

(73) Assignee: The Boeing Company, Chicago, IL (US)

( * ) Notice: Subject to any disclaimer, the term of this patent is extended or adjusted under 35 U.S.C. 154(b) by 8 days.

(21) Appl. No.: 10/776,614

(22) Filed: Feb. 12, 2004

(65) Prior Publication Data
US 2005/0177990 A1 Aug. 18, 2005

(51) Int. Cl.
*B23P 21/00* (2006.01)
*B23Q 17/00* (2006.01)

(52) U.S. Cl. .................... 29/705; 29/709; 29/407.1

(58) Field of Classification Search ........... 29/407.01, 29/407.04, 407.05, 407.08, 705, 709, 712, 29/720, 722; 73/865.9; 703/1; 33/556
See application file for complete search history.

(56) References Cited

U.S. PATENT DOCUMENTS

| | | | |
|---|---|---|---|
| 3,816,929 A | * 6/1974 | Kiffe et al. | 33/556 |
| 4,823,396 A | 4/1989 | Thompson | 382/8 |
| 4,828,159 A | 5/1989 | Woods | 227/156 |
| 5,012,592 A | 5/1991 | Greenslade | 33/833 |
| 5,117,561 A | 6/1992 | Greenslade | 33/573 |
| 5,150,623 A | 9/1992 | Woods | 73/865.8 |
| 5,727,300 A | 3/1998 | Ekdahl et al. | 29/407.04 |
| 6,111,601 A | 8/2000 | Adachi | 348/92 |
| 2002/0144532 A1 | 10/2002 | Bartrom et al. | 72/402 |

FOREIGN PATENT DOCUMENTS

| | | |
|---|---|---|
| EP | 0663248 | 3/1998 |
| JP | 06-300541 | 10/1994 |
| JP | 08-122005 | 5/1996 |
| WO | 96/24450 | 8/1996 |
| WO | 97/21072 | 6/1997 |

* cited by examiner

*Primary Examiner*—John C. Hong
(74) *Attorney, Agent, or Firm*—Baker & Hostetler LLP

(57) ABSTRACT

To evaluate a fastener, a cam that is contoured to correspond to a relationship between a first dimension of the fastener and a second dimension of the fastener is utilized. The cam is movable between a first position and a second position and the fastener is evaluated based on whether an electrical connection is completed when contact occurs between the cam and the fastener while the cam is moved from the first position to the second position.

24 Claims, 7 Drawing Sheets

SWAGE COLLAR INSPECTION TOOL

FIELD OF THE INVENTION

The present invention generally relates to an inspection device. More particularly, the present invention pertains to a device and method of inspecting swaged collars.

BACKGROUND OF THE INVENTION

Mechanical fasteners are utilized to bind a variety of materials. While there are a great variety of mechanical fasteners, a few specific examples includes rivets, lock-bolts, screws, and the like. To facilitate a relatively strong and durable bond, mechanical fasteners are typically installed according to a manufacturer's recommended procedure. Often, these procedures include the application of a specified force to permanently deform the fastener. For example, rivets, lock-bolts, and various crimped connectors are installed in such a manner.

In relatively high technology industries, such as the aerospace industry, it is important that each fastener perform its function with a sufficiently high degree of precision to maintain fastener integrity. In this regard, these fasteners are often manually inspected following installation. Prior art procedures for this inspection involve carefully placing a series of indicator cards upon each fastener and visually inspecting the points of contact to determine fastener compliance. Other prior art procedures include precisely measuring several dimensions of each fasten and manually comparing the measured values to a table of allowable values. Unfortunately, these prior art procedures are tedious, time consuming, prone to human error, expensive, and/or lack the ability to audit. As such, an improperly installed fastener having undesirable material and/or electrical properties may result.

Accordingly, it is desirable to provide a method and apparatus capable of overcoming the disadvantages described herein at least to some extent.

SUMMARY OF THE INVENTION

The foregoing needs are met, at least to a great extent, by the present invention, wherein in one respect an apparatus and method is provided that in some embodiments inspects a swaged collar of a fastener.

An embodiment of the present invention pertains to a device to evaluate a fastener. This device includes a cam that is contoured to correspond to a relationship between a first dimension of the fastener and a second dimension of the fastener. The cam is movable between a first position and a second position and the fastener is evaluated based on whether an electrical connection is completed when contact occurs between the cam and the fastener while the cam is moved from the first position to the second position.

Another embodiment of the present invention relates to a system to evaluate a fastener. This system includes a device and a processor. The device includes a sensor having a cam contoured to correspond to a relationship between a first dimension of the fastener and a second dimension of the fastener. The cam is movable between a first position and a second position and the fastener is evaluated based on whether an electrical connection is completed when contact occurs between the cam and the fastener while the cam is moved from the first position to the second position. The processor receives signals from the sensor and determines whether the first dimension and the second dimension are between a first value and a second value.

Yet another embodiment of the present invention pertains to an apparatus for evaluating a fastener installed in a substrate. The fastener has a height relative to the substrate. This apparatus includes a means for sensing the height, a means for sensing a feature of the fastener, and a means for determining whether the feature is between a first value and a second value in response to the sensed height.

Yet another embodiment of the present invention relates to a method of evaluating a fastener installed in a substrate. The fastener has a height relative to the substrate. In this method, the height is sensed, a feature of the fastener is sensed, and it is determined whether the feature is between a first value and a second value in response to the sensed height.

Yet another embodiment of the present invention pertains to a method of generating a probe to evaluate a fastener. The fastener includes a plurality of dimensions. In this method a set of relationships is determined for the plurality of dimensions and a table based on the set of relationships is generated. This table includes a plurality of columns and a plurality of rows. Each column corresponds to a dimension of the plurality of dimensions and each row corresponds to the relationship between the plurality of dimensions at a particular value. In addition, a cam is shaped to include a contour that corresponds to a column of the plurality of columns.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

Figure 1B:
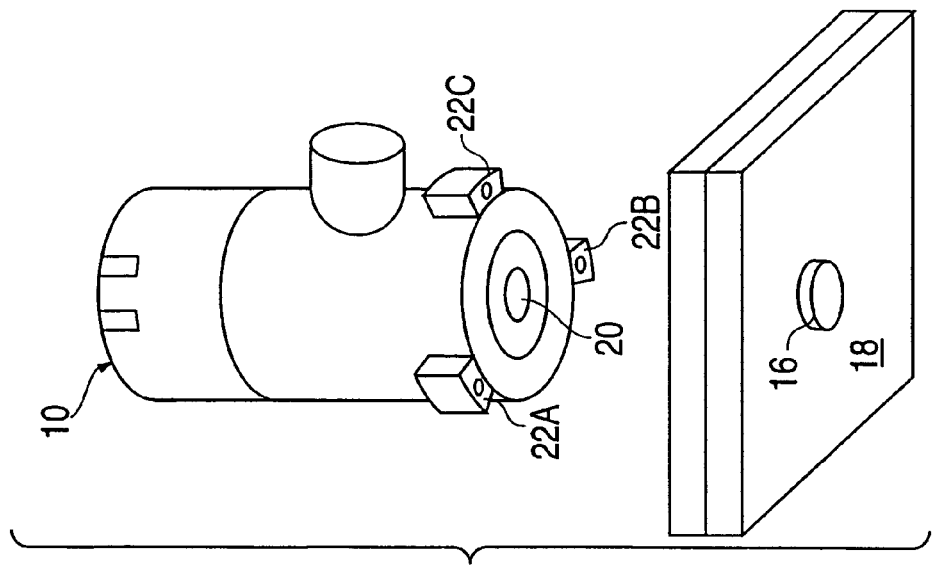
FIGS. 1A and 1B are perspective views of a device for inspecting a swage collar according to an embodiment of the invention.
Figure 1A:
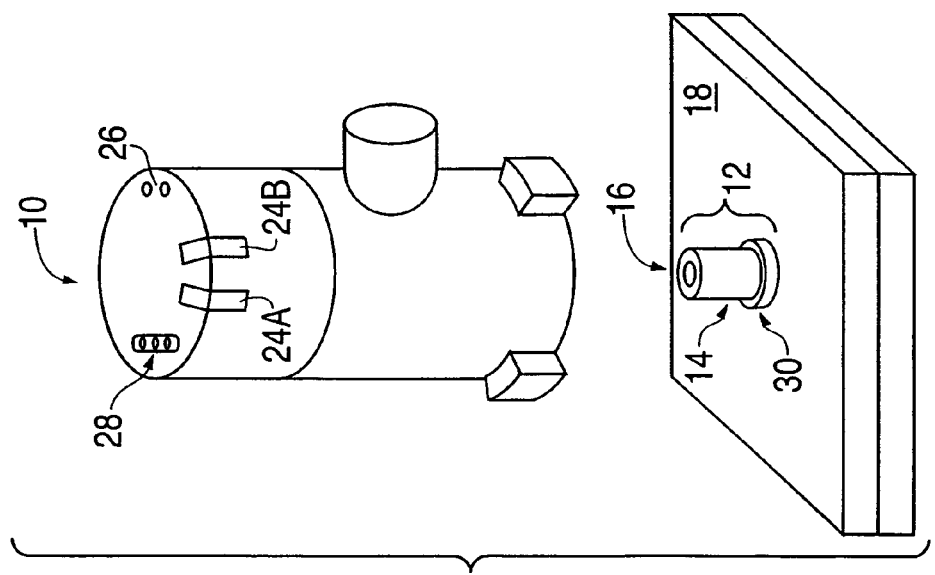

An embodiment of the invention will now be described with reference to the drawing figures, in which like reference numerals refer to like parts throughout. As shown in FIGS. 1A and 1B, an inspection device 10 is operable to evaluate a fastener 12. This fastener 12 includes a collar 14 swaged on to a lock-bolt pin 16. This fastener 12 is installed in a material 18. The inspection device 10 includes an orifice 20, a plurality of position sensors 22A–22C, a plurality of indicators 24A and 24B, a power connector 26, and a network connector 28.

The orifice 20 is sized to be slightly larger in diameter than a portion of the collar 14 that has been materially deformed during the swaging process. In this swaging process, a swaging die is forced over a portion of the collar 14, narrowing that portion of the collar 14. At the conclusion of the swaging process a shoulder 30 is created on the collar 14 at the limit of the swaging die's progress. The position along the collar 14 that this shoulder 30 is created is indicative of the degree to which the collar 14 has been swaged. The orifice 20 is sized so that when the inspection device 10 is placed over the collar 14, it slides over the narrowed portion of the collar 14 and rest upon the shoulder 30.

The position sensors 22A–22C are optionally included to indicate contact with the surface 18. In various forms, the position sensors 22A–22C may include any suitable device such as, for example: electrical contact pads; pressure sensors; snap-action type switches; and the like. Specific examples of snap-action type switches include series K switches manufactured by The Cherry Corporation of Waukegan, Ill. USA. If present, the inspection device 10 may include one or more position sensors. Therefore, the three position sensors 22A–22C are for illustration purposes only.

The indicators 24A and 24B emit a signal such as, for example, a visual, auditory, and/or tactile signal. The signal is to inform a user as to whether or not the fastener 12 is within acceptable tolerances. In an embodiment of the invention, there are two indicators: one to indicate the fastener is within tolerance and; one to indicate the fastener is out of tolerance. For example, the indicator 24A may include a green light emitting diode (LED) that, when lit, indicates that the fastener 12 is within tolerance. In addition, the indicator 24B may include a red LED that, when lit, indicates that the fastener 12 is outside of acceptable tolerances. In various other embodiments of the invention, the inspection device 10 includes any reasonable number of indicators, such as, for example: 3 to 10 indicators.

The power connector 26 is to supply power to the various components of the inspection device 10. In addition, the network connector 28 is optionally included to provide a two way communication path between the inspection device 10 and any other suitably configured electronic device.

Figure 2A:
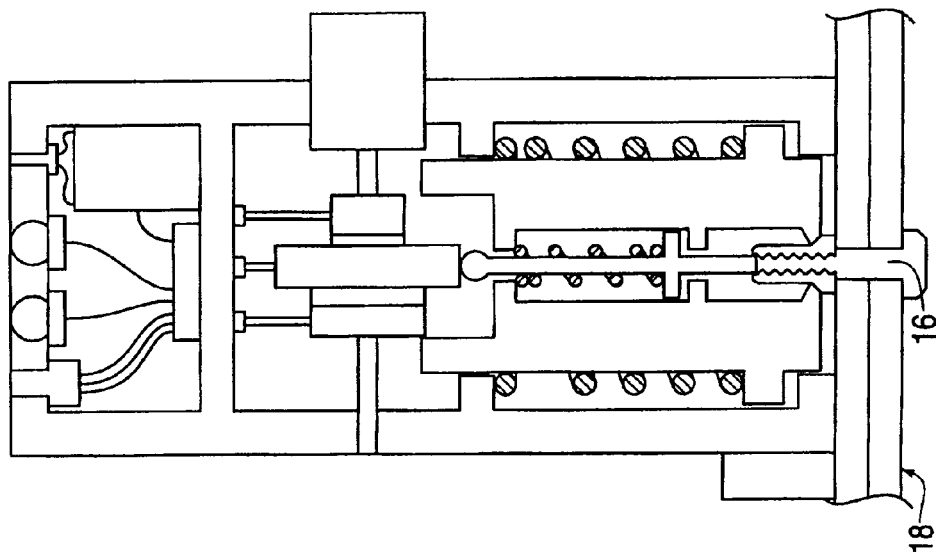
FIGS. 2A and 2B are cross sectional views of the inspection device according to FIGS. 1A and 1B.
Figure 2B:
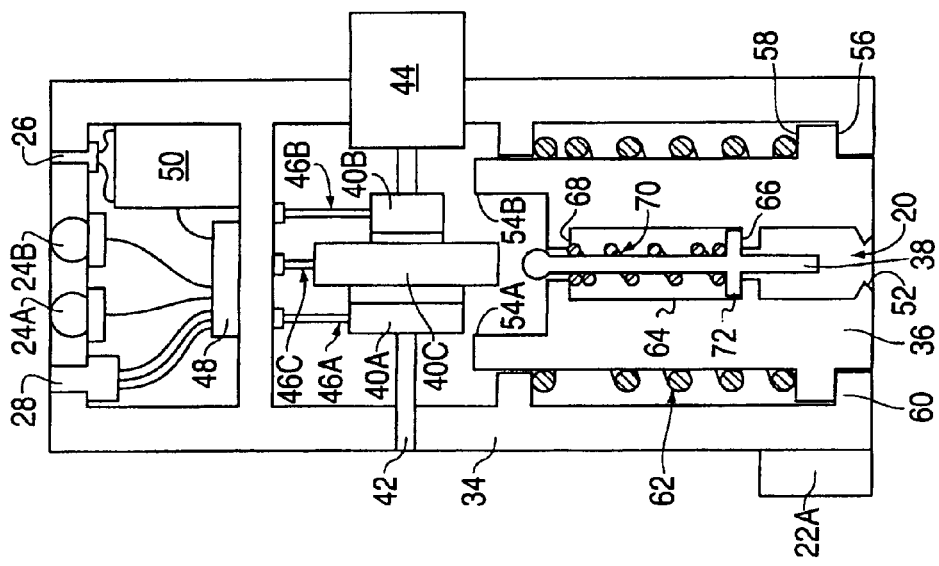

FIGS. 2A and 2B are cross sectional views of the inspection device 10 according to FIGS. 1A and 1B. The inspection device 10 shown in FIG. 1A is depicted in a ready state. As shown in FIG. 2A, the inspection device 10 includes a housing 34, shoulder feeler 36, pin feeler 38, plurality of cams 40A–40C, camshaft 42, actuator 44, plurality of pick-ups 46A–46C, controller 48, and power supply 50. The housing 34 provides a support structure and protective envelope for the various other components of the inspection device 10. In this regard, the housing 34 is generally formed from a relatively rigid and impermeable material. Examples of suitable materials include metals, resins, plastics, composite materials, and the like. In a preferred form, the housing 34 is formed from an electrically conductive material such as metal.

The shoulder feeler 36 is formed to include a number of features. Primary among these features is the orifice 20. The orifice 20 includes a shoulder land 52 configured to approximately mate with the shoulder 30. That is, the shoulder 30 is formed at an angle of between 15° and 90° relative to the plane of the material 18. This angle depends upon the particular application and the fasteners' manufacture's specifications. For a specific application, the angle is essentially equal to 45° and thus, the shoulder land 52 is formed at a complementary angle. In this manner, positive contact between the two surfaces is facilitated and excessive wear is reduced. Subsequent to the shoulder land 52, the bore of the orifice 20 is increased somewhat to ease entry of the fastener 12 into the orifice 20.

In addition, the shoulder feeler 36 includes a pair of contacts 54A and 54B. The contact 54A is configured to complete a circuit when touching the cam 40A. In a similar manner, the contact 54B is configured to complete a circuit when touching the cam 40B. The shoulder feeler 36 further includes a bearing surface 56 and 58. The bearing surface 56 substantially prevents the shoulder feeler 36 from being withdrawn from the housing 34. In this regard, the housing 34 includes a retaining lip 60 that acts in conjunction with the bearing surface 56 to substantially prevent the shoulder feeler 36 from being withdrawn from the housing 34. The bearing surface 58 provides a surface onto which a spring 62 may thrust. The spring 62 provides sufficient force so as to urge the shoulder feeler 36 towards the retaining lip 60.

The shoulder feeler 38 further includes an axial bore 64 to guide the operation of the pin feeler 38. This axial bore 64 includes a stop 66 and bearing surface 68. The stop 66 substantially prevents the pin feeler 38 from being withdrawn from the axial bore 64. The bearing surface 68 provides a surface onto which a spring 70 may thrust. In this regard, the pin feeler 38 includes a retainer 72 that acts in conjunction with the stop 66 to retain the pin feeler 38 within the axial bore 64. The retainer 72 also provides a bearing surface onto which the spring 70 may thrust. In this manner, the retainer 72 is urged towards the stop 66 by the action of the spring 70 thrusting against the bearing surface 68.

As shown in FIG. 2B, as the inspection device 10 is positioned over the fastener 12, the pin feeler 38 is displaced towards the cam 40C in response to contact with the lock-bolt pin 16. In addition, the shoulder feeler 36 is displaced towards the cams 40A and 40B in response to the shoulder land 52 contacting the shoulder 30.

The cams 40A–40C (shown edge-on in FIGS. 2A and 2B) are rotatable about the camshaft 42. The profiles of the cams 40A–40C are based upon a table of offsets. This table is generated in response to extensive testing of fasteners. For example, many hundreds of a particular type of fastener are installed in a variety of materials over a range of conditions. These fasteners are then stressed until failure to determine acceptable values for this type of fastener. An example of such a table of offsets follows:

TABLE 1

| Entry | Pin Height | Minimum Shoulder Height | Maximum Shoulder Height |
|---|---|---|---|
| 1 | 0.302 | 0.085 | 0.121 |
| 2 | 0.301 | 0.084 | 0.121 |
| 3 | 0.300 | 0.084 | 0.120 |
| . | . | . | . |
| . | . | . | . |
| . | . | . | . |
| 82 | 0.221 | 0.036 | 0.075 |
| 83 | 0.220 | 0.036 | 0.074 |
| 84 | 0.219 | 0.036 | 0.074 |

As shown in Table 1, the minimum shoulder height ($S_{min}$) and the maximum shoulder height ($S_{max}$) vary relative to the pin height ($P_{height}$). Stated in another manner, the range of acceptable heights for the shoulder 30 varies in accordance to the $P_{height}$. In addition, it is to be noted that pin heights falling outside those listed in Table 1 are out of tolerance. That is, the $P_{height}$ listed at entry 1 of the Table 1 represents a maximum $P_{height}$ ($P_{max}$) and the $P_{height}$ listed at entry 84 represents a minimum $P_{height}$ ($P_{min}$). Thus, a sensed $P_{height}$ falling outside the $P_{max}$ and the $P_{min}$ is outside an acceptable range of tolerance.

Figure 7A:
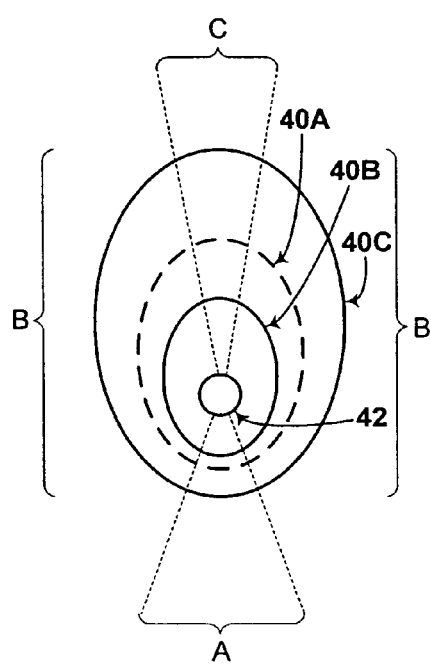
FIGS. 7A and 7B are examples of cams suitable for use with the inspection device according to FIGS. 1A and 1B.
Figure 7B:
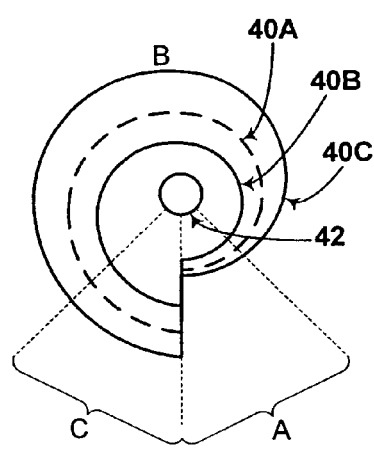

For the purpose of this disclosure, the term "cam" is used to describe a surface that is contoured to correspond a table of offsets such as those of Table 1. For the purpose of illustration, examples of cams suitable for use in the inspection device 10 are illustrated in FIGS. 7A and 7B. However, the invention is not limited to these example, but rather, any suitable surface contoured to conform to a table of offsets may be utilized in the inspection device 10 and thus is within the scope of the invention. As the cam 40C is rotated about the camshaft 42, the radius of the cam 40C measured above the pin feeler 38 varies according to the values listed in the pin height column of Table 1. Similarly, as the cams 40A and 40B are rotated about the camshaft 42, the radius of the cams 40A and 40B as measured above the contacts 54A and 54B vary respectively according to the values listed in the minimum shoulder height and maximum shoulder height columns of Table 1. In addition, as the cams 40A-40C rotate in a substantially unison manner, the ratios found in each row of Table 1 that relates pin height to $S_{min}$ and $S_{max}$ is essentially maintained.

The cams 40A-40C are electrically isolated from each other. In addition, when not touching the contacts 54A and 54B, and the pin feeler 38, the cams 40A-40C are electrically isolated from these components as well. However, at least a portion of the surface of each of the cams 40A-40C is electrically conductive and, when contacted by the respective contacts 54A, 54B, or pin feeler 38, a respective electrically conductive path is created.

According to various embodiments of the invention, the actuator 44 includes any suitable rotating or actuating device configured to rotate the camshaft 42. Examples of suitable rotating devices include stepper motors, electro servomotors, induction motors, alternating current (AC) brushed and brushless motors, direct current (DC) brushed and brushless motors, and the like. Examples of other suitable actuating devices include linear motors, linear actuators, and the like. In addition, according to another embodiment of the invention, the actuator 44 is a knob or handle that is rotatable by the user. In this manner, the inspection device may be constructed for considerably less expense.

Each of the pickups 46A-46C are in electrical contact with a respective one of the cams 40A-40C. For example, the pickup 46A may include a flexible metal wire or ribbon disposed under tension against the cam 40A.

The controller 48 is optionally included in the inspection device 10 to reduce human error, increase automation and repeatability, and increase traceability of the inspection process. If present, the controller 48 is operable to execute computer readable code, receive signals from the position sensors 22A-22C and the pickups 46A-46C, communicate via the network connector 28, control the indicators 24A and 24B and the actuator 44, and receive power via the power supply 50. According to the computer readable code, the controller 48 is configured to interpret the signals received from the pickups 46A-46C and modulate the various components it is configured to control.

The power supply 50 provides power for the various components of the inspection device 10. In various embodiments of the invention, the power supply 50 includes power storage, generating, transforming, and/or conditioning capabilities. For example, the power supply 50 may include a rechargeable battery that is operable to be recharged via the power connector 26.

Figure 3:
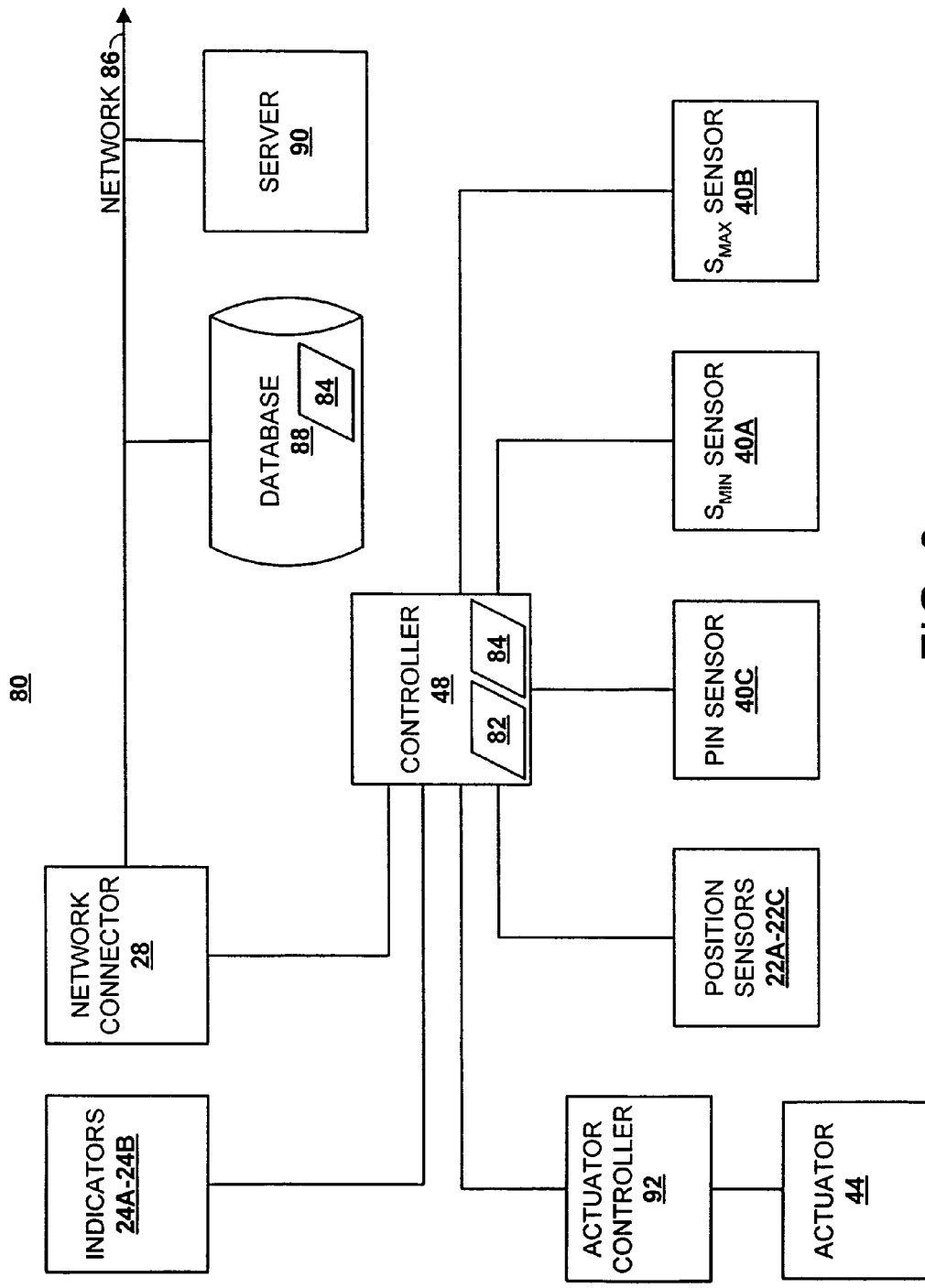
FIG. 3 is a block diagram of a system for inspecting a swage collar suitable for use with the inspection device according to FIGS. 1A and 1B.

FIG. 3 is a block diagram of a system 80 suitable for use with the inspecting device 10. As shown in FIG. 3, the controller 48 is operable to execute computer readable code. In this regard, the system 80 includes a set of computer readable instructions or code 82. According to the code 82, the controller 48 is configured to generate and store data to a file 84. This file 84 includes one or more of the following: data gathered while evaluating fasteners; timestamp information; positional information; identification numbers; and the like. The controller 48 is further configured to communicate across a network 86 via the network connector 28. The network 86 is optionally included to provide additional data storage and/or processing capabilities. In this regard, the network includes a database 88 and a server 90. The database 88 is configured to store a copy of the file 84. The server 90 is configured to process the file 84. In this manner, trends associated with the installation of fasteners may be extrapolated. In addition, the server 90 is operable, via the network 86, to forward updates for the code 82.

Also shown in FIG. 3 is an actuator controller 92. The actuator controller 92 is optionally included in the systems 80 depending upon the requirements of the actuator 44. That is, if the actuator 44 is operable to be modulated by the controller 48 directly, the system 80 may not include the actuator controller 92. If present, parameters of the actuator controller 92 are based upon the specification of the actuator 44 and the controller 48.

Figure 4:
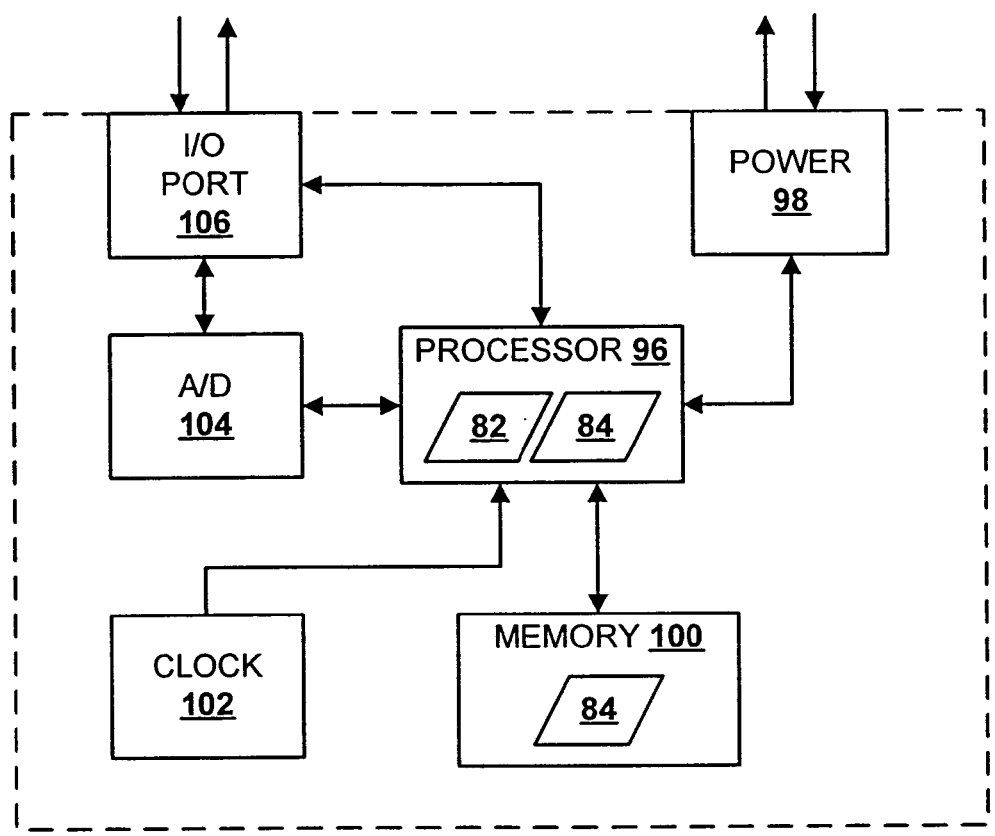
FIG. 4 is a system architecture for a controller suitable for use in the system according to FIG. 3.

FIG. 4 is a system architecture for the controller 48 suitable for use in the system 80. As shown in FIG. 4, the controller 48 includes a processor 96. This processor 96 is operably connected to a power supply 98, memory 100, clock 102, analog to digital converter (A/D) 104, and an input/output (I/O) port 106. The I/O port 106 is configured to receive signals from any suitably attached electronic device and forward these signals to the A/D 104 and/or the processor 96. For example, the I/O port 106 may receive signals associated with pin height sensed by the cam 40C and forward the signals to the processor 96. In another example, the I/O port 106 may receive signals via the network connector 28 and forward the signals to the processor 96. If the signals are in analog format, the signals may proceed via the A/D 104. In this regard, the A/D 104 is configured to receive analog format signals and convert these signals into corresponding digital format signals. Conversely, the A/D 104 is configured to receive digital format signals from the processor 96, convert these signals to analog format, and forward the analog signals to the I/O port 106. In this manner, electronic devices configured to receive analog signals may intercommunicate with the processor 96.

The processor 96 is configured to receive and transmit signals to and from the A/D 104 and/or the I/O port 106. The processor 96 is further configured to receive time signals from the clock 102. In addition, the processor 96 is configured to store and retrieve electronic data to and from the memory 100. Furthermore, the processor 96 is configured to determine signals operable to modulate the actuator controller 92 and thereby control the actuator 44 to exert a particular force and/or rotate to a particular degree. For example, signals associated with rotating the actuator 44, 1° in the counterclockwise direction may be forwarded to the actuator controller 92 by the processor 96 via the I/O port 106.

According to an embodiment of the invention, the processor 96 is configured to execute the code 82. Based on this set of instructions and signals from the various components of the inspection device 10, the processor 96 is configured to: determine the height of the pin 16; determine whether the pin height is within a predetermined range of heights and further; whether the shoulder height is between the $S_{min}$ and $S_{max}$ for the given pin height. For example, the processor 96 controls the actuator 44 to rotate until the cam 40C contacts the pin feeler 38. The processor 96 determines whether the degree of rotation correlates to an acceptable pin height. If the pin height is within an acceptable range, the processor 96 further determines if the shoulder height is acceptable based on whether the cam 40A and not the cam 40B are in respective contact with the contacts 54A and 54B. In this manner, the fastener 12 is evaluated.

Figure 5:
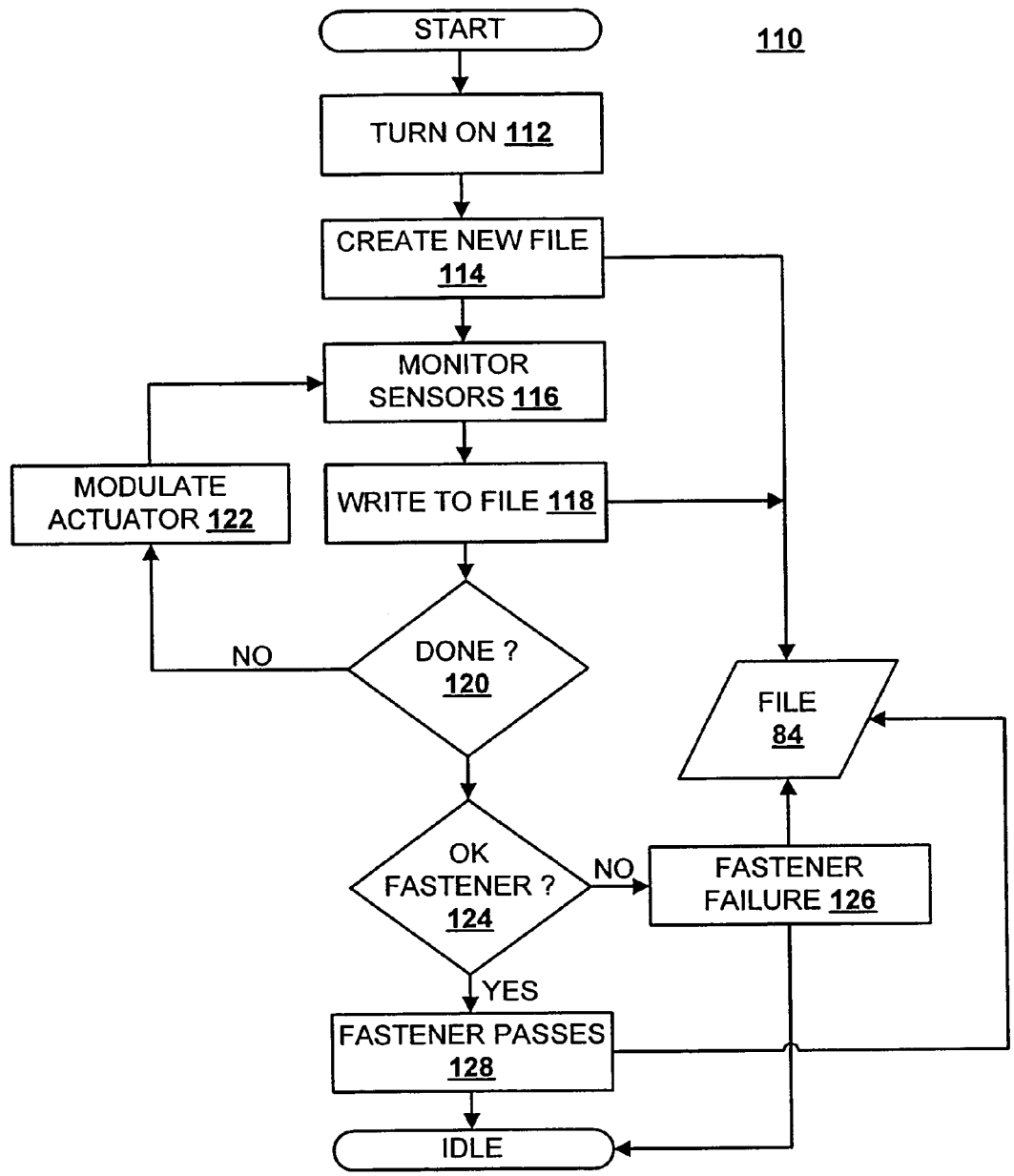
FIG. 5 is a flow diagram according to an embodiment of the invention.

FIG. 5 is a flow diagram of a method 110 according to an embodiment of the invention. Prior to the method 110, one or more fasteners such as the fastener 12 are installed in a material such as the material 18. In order to determine if these one or fasteners have been installed in a suitable manner, the method 110 is performed by the inspection device 10. The method 110 is initiated at step 112 in response to turning on the device 10. For example, in response to signals from the position sensors 22A–22C, the processor 96 is configured to follow the set of instructions set forth in the code 82. According to this code 82, the processor 96 creates and/or accesses the file 84 at step 114.

At step 116 the various sensors are monitored. For example, the processor 96 determines if one or more of the plurality of cams 40A–40C is in contact with their respective contact 54A and 54B or pin feeler 38.

At step 118 data is written to the file 84. For example, data associated with signals forwarded to the processor 96 by the various sensors is written to or stored to the file 84. In addition, time stamp information and other data associated with evaluation of the fastener 12 may be stored to the file 84 at step 118.

At step 120 it is determined whether the inspection is completed. For example, if the processor 96 determines that the cam 40B and/or 40C is in contact with its respective contact 54B and/or pin feeler 38, then it is determined that the inspection is complete and the fastener is evaluated at step 124. If it is determined that neither the cam 40B nor 40C is in contact with its respective contact 54B and pin feeler 38, then it is determined that the inspection is incomplete and the cams 40A–40C modulated at step 122.

At step 122 the cams 40A–40C modulated. For example, the actuator 44 is controlled to rotate the camshaft 42 and thereby rotate the cams 40A–40C.

At step 124 a determination is made as to whether fastener 12 is suitably installed in material 18. In general, if one or more parameter(s) of fastener 12 are outside the respective tolerance range then, a determination is made that fastener has failed the evaluation. For example, if the $P_{height}$ is determined to be outside of the $P_{max}$ and $P_{min}$ then it is determined that the fastener 12 has failed the evaluation. In another example, if the $P_{height}$ is determined to be within the $P_{max}$ and $P_{min}$ and the shoulder height is determined to be greater than $S_{max}$ then it is determined that the fastener 12 has failed the evaluation. If it is determined that the fastener 12 has failed the evaluation, the user is notified and data associated with the failure is stored to the file 84 at step 126. Alternatively, if it is determined that the fastener 12 is installed in the material 18 within accepted tolerances then, the user is notified and data associated with the inspection process is written to the file 84 at step 128.

At step 126 the user is notified and data associated with the failure of the fastener 12 is stored to the file 84. For example, the controller 48 controls the indicator 24B to emit a visual and/or auditory signal and the various sensed parameters of the fastener 12 such as the $P_{height}$, shoulder height, and the like may be stored to the file 84. In addition, a timestamp or other such information may be stored to the file 84. In general, it is desirous that the visual and/or auditory signal associated with a failure of the fastener 12 be such that it is clearly differentiated from a passing of fastener 12. For example, a red light signifies an out-of-tolerance condition whereas, a green light signifies an acceptable condition. Following the step 126, the inspection device 10 may idle or shutdown until the method 110 is initiated again.

At step 128 the user is notified and data associated with the fastener 12 is stored to the file 84. For example, the controller 48 controls the indicator 24A to emit a visual and/or auditory signal and the various sensed parameters of the fastener 12 such as the $P_{height}$, shoulder height, and the like may be stored to the file 84. In addition, a timestamp or other such information may be stored to the file 84. Following the step 126, the inspection device 10 may idle or shutdown until the method 110 is initiated again.

The method 110 may exist in a variety of forms both active and inactive. For example, it may exist as software program(s) comprised of program instructions in source code, object code, executable code or other formats. Any of the above may be embodied on a computer readable medium, which include storage devices and signals, in compressed or uncompressed form. Examples of computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the program(s) on a CD ROM or via Internet download. In a sense, the Internet itself, as an abstract entity, is a computer readable medium. The same is true of computer networks in general.

Figure 6:
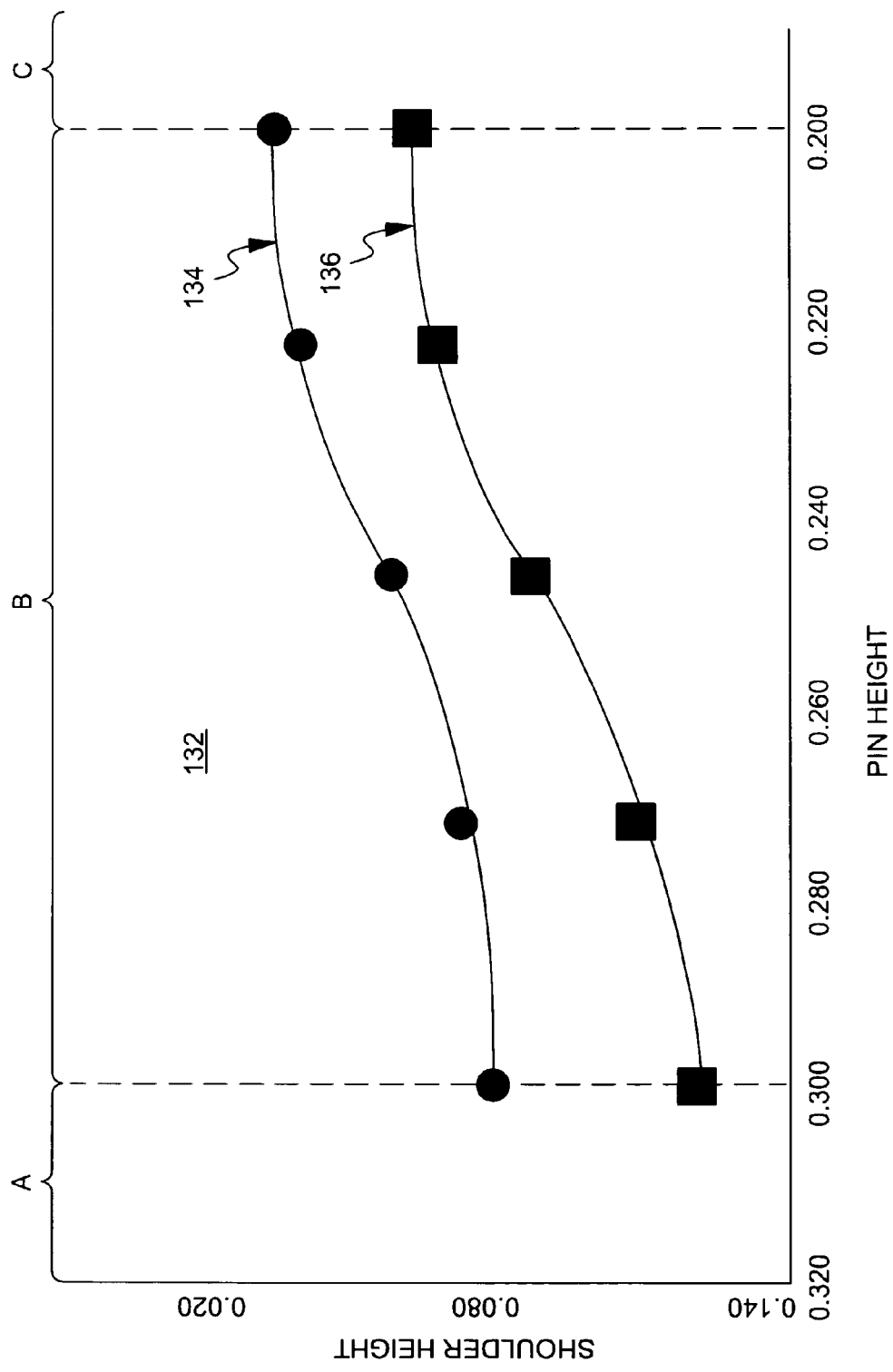
FIG. 6 is an example of a graph of pin height (abscissa) as it affects the shoulder height (ordinate) according to an embodiment of the invention.

FIG. 6 is an example of a graph 132 of pin height, in thousandths of an inch, (abscissa) as it affects the shoulder height, in thousandths of an inch, (ordinate). As shown in FIG. 6, the minimum and maximum shoulder height (respectively $S_{min}$ and $S_{max}$) may be plotted in terms of the pin height ($P_{height}$). In general, the $S_{min}$ and $S_{max}$ are shown to increase as the $P_{height}$ increases. In this regard, a line 134 includes a plurality of circular data nodes representing the $S_{min}$ at the respective $P_{height}$. Similarly, a line 136 includes a plurality of square data nodes representing the $S_{max}$ at the respective $P_{height}$. As described herein with reference to Table 1, these data nodes may be determined empirically and/or may be based on computer modeling of fasteners. As shown in FIG. 6, the curvature of the lines 134 and 136 differ somewhat. However, the graph 132 is for illustrative purposes only, and thus, the respective curvatures, slopes and y-intercepts may be the same or different depending on the response of the various components.

In addition, the graph 132 is subdivided into sections A, B and C. Section A represents pin heights that exceed the maximum acceptable pin height ($P_{max}$). Section B represents acceptable pin heights that are between the $P_{max}$ and $P_{min}$. Section C represents pin heights that fall below the $P_{min}$.

FIGS. 7A and 7B are examples of cams suitable for use with the inspection device 10 according to FIGS. 1A and 1B. In FIGS. 7A and 7B, the cams 40A–40C are viewed from a direction inline with the camshaft 42. As shown in FIG. 7A the cams 40A–40C include the sections A, B and C that correspond to the sections A, B and C of the graph 132 shown in FIG. 6. In particular, as the cam 40A is utilized to sense the $S_{min}$, the contour of the perimeter of the cam 40A is based upon the contour of the line 134. Similarly, the contour of the perimeter of the cam 40B is based upon the contour of the line 136.

With regard to cam 40C, in various embodiments of the invention, the electrical properties of the material in sections A and C differ from that of section B. For example, sections A and C may be formed from or coated with an essentially non-conducting material. In this manner, if the pin feeler 38 contacts these essentially non-conducting regions, an error may be noted and the fastener 12 would fail the inspection. In another example, the electrical properties of the material in section A may differ from section C. In this example, section B is electrically conductive, section A has a first resistive property, and section C has a second resistive property. In this manner, the controller 48 may be configured to determine whether the pin 16 is below the $P_{min}$, above the $P_{max}$, or within an acceptable range of pin heights. In another embodiment, sections A, B and C of the cam 40C are substantially conductive and the controller 48 determines the pin height based upon the rotation of the camshaft 42.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A device to evaluate a fastener, the device comprising:
a plurality of cams contoured to correspond to respective relationships between a plurality dimensions of the fastener, each of the plurality of cams being movable between a respective first position and a respective second position, wherein the fastener is evaluated based on whether an electrical connection is completed when contact occurs between the plurality of cams and the fastener while the cams are moved from the respective first positions to the respective second positions.

2. The device according to claim 1, further comprising;
a respective feeler disposed between each of the plurality of cams and the fastener to contact the fastener and complete the electrical connection when touching the each respective cam.

3. The device according to claim 1, further comprising:
an indicator to emit a signal in response to the first dimension and the second dimension being between a minimum value and a maximum value.

4. The device according to claim 3, wherein the indicator emits a visual signal.

5. The device according to claim 3, wherein the indicator emits an auditory signal.

6. The device according to claim 1, further comprising:
an axle to rotate the cams from the respective first positions to the respective second positions.

7. The device according to claim 1, further comprising:
a processor to determine whether the electrical connection has been completed.

8. The device according to claim 7, further comprising:
an actuator to move the cam from the first position to the second position, the actuator being controlled by the processor.

9. The device according to claim 8, further comprising:
a placement sensor to sense whether the device is disposed upon the fastener, the processor receiving a signal from the placement sensor in response to the device being disposed upon the fastener, wherein the processor evaluates the fastener in response to receiving the signal.

10. A system to evaluate a fastener, the system comprising:
a device comprising:
a plurality of sensors, each sensor having a respective cam contoured to correspond to respective relationships between a plurality dimensions of the fastener, each of the plurality of cams being movable between a respective first position and a respective second position, wherein the fastener is evaluated based on whether an electrical connection is completed when contact occurs between the respective cam and the fastener while the cams are moved from the respective first positions to the respective second position; and
a processor to receive signals from the plurality of sensors, the processor determining whether the first dimension and the second dimension are between a first value and a second value.

11. The system according to claim 10, further comprising;
a feeler disposed between the cam and the fastener to contact the fastener and complete the electrical connection when touching the cam.

12. The system according to claim 10, further comprising:
an indicator to emit a signal in response to the first dimension and the second dimension being between a minimum value and a maximum value.

13. The system according to claim 12, wherein the indicator emits a visual signal.

14. The system according to claim 12, wherein the indicator emits an auditory signal.

15. The system according to claim 10, further comprising:
an axle to rotate the cams from the respective first positions to the respective second positions.

16. The system according to claim 10, further comprising:
an actuator to move the cams from the first position to the second position, the actuator being controlled by the processor.

17. The system according to claim 10, further comprising:
a placement sensor to sense whether the device is disposed upon the fastener, the processor receiving a signal from the placement sensor in response to the device being disposed upon the fastener, wherein the processor evaluates the fastener in response to receiving the signal.

18. The system according to claim 10, further comprising:
a memory to store data associated with fastener evaluation.

19. The system according to claim 10, further comprising:
a network to connect the processor to a database.

20. An apparatus for evaluating a fastener installed in a substrate, the fastener having a height relative to the substrate, the apparatus comprising:
means for sensing the height;
means for sensing a feature of the fastener; and
means for determining whether the feature is between a first value and a second value in response to the sensed height;
means for completing an electrical circuit in response to a camming means contacting the fastener, the cammming means being contoured to correspond to a relationship between the height and the feature of the fastener, wherein the circuit completing means comprises a plurality of sensors, each sensor having a respective cammming means contoured to correspond to respective relationships between a plurality dimensions of the fastener, each of the plurality of camming means being movable between a respective first position and a respective second position, wherein the fastener is evaluated based on whether an electrical connection is completed when contact occurs between the respective camming means and the fastener while the camming means are moved from the respective first positions to the respective second position.

21. The apparatus according to claim 20, further comprising:
means for turning on an indicator means in response to the feature being between the first value and the second value.

22. The apparatus according to claim 20, wherein the determining step further comprises:
means for rotating the camming means about an axis.

23. The apparatus according to claim 20, further comprising:
means for storing the determination to a memory means.

24. The apparatus according to claim 20, further comprising:
means for forwarding the determination across a network means to a network enabled device means.

* * * * *

UNITED STATES PATENT AND TRADEMARK OFFICE
CERTIFICATE OF CORRECTION

PATENT NO. : 7,152,307 B2
APPLICATION NO. : 10/776614
DATED : December 26, 2006
INVENTOR(S) : Jeffery P. Swanberg et al.

It is certified that error appears in the above-identified patent and that said Letters Patent is hereby corrected as shown below:

Title Page:
Item (75)
Please replace "Richard W. Spicet" with --Richard W. Spicer--;

Column 10
Line 7, please replace "the" with --a--;

Line 8, please replace "dimension and the second dimension" with --dimension of the plurality of dimensions and a second dimension of the plurality of dimensions--;

Lines 45-46, please replace "the first dimension and the second dimension" with --a first dimension of the plurality of dimensions and a second dimension of the plurality of dimensions--;

Line 49, please replace "a feeler disposed between the cam" with --a respective feeler disposed between each of the cams--;

Line 51, please replace "the cam" with --the respective cam--;

Column 11
Line 23, please replace "cammming" with --camming--;

Line 27, please replace "cammming" with --camming--.

Signed and Sealed this

Fifteenth Day of May, 2007

JON W. DUDAS
*Director of the United States Patent and Trademark Office*